United States Patent [19]

Nyman et al.

[11] Patent Number: 4,818,503
[45] Date of Patent: Apr. 4, 1989

[54] EXTRACTION PROCESS FOR REMOVING AND RECOVERING METALS FROM AQUEOUS SOLUTIONS

[75] Inventors: Bror G. Nyman, Ulvila; Leif Erik I. Hummelstedt, Turku, both of Finland

[73] Assignee: Outokumpu Oy, Helsinki, Finland

[21] Appl. No.: 96,245

[22] Filed: Sep. 8, 1987

Related U.S. Application Data

[63] Continuation of Ser. No. 746,732, Jun. 20, 1985, abandoned.

[30] Foreign Application Priority Data

Jul. 3, 1984 [FI] Finland ................................... 842668

[51] Int. Cl.$^4$ ........................................... C01G 113/00
[52] U.S. Cl. ......................................... 423/10; 423/24; 423/49; 423/54; 423/100; 423/139; 423/157; 423/658.5
[58] Field of Search ...................... 423/10, 24, 49, 54, 423/100, 139, 157, 658.5

[56] References Cited

U.S. PATENT DOCUMENTS

| | | | |
|---|---|---|---|
| 2,859,094 | 11/1958 | Schmitt et al. | 423/10 |
| 2,869,980 | 1/1959 | Grinstead | 423/10 |
| 3,052,514 | 9/1962 | Schmitt | 423/10 |
| 4,246,103 | 1/1981 | Block et al. | 210/699 |
| 4,356,153 | 10/1982 | Bathellier et al. | 423/10 |
| 4,460,548 | 7/1984 | Sturtz | 423/10 |

OTHER PUBLICATIONS

Hurst et al., *Ind. Eng. Chem. Process Des. Develop.*, 11 (#1), 1972, pp. 122–128.
Murthy, "Study of Some Phenyl Phosphoric Acids for Extraction of Uranium from Phosphoric Acid", pp. 341–350, IAEA-SM-135/11, (1970).

*Primary Examiner*—Edward A. Miller
*Attorney, Agent, or Firm*—Brooks, Haidt, Haffner & Delahunty

[57] ABSTRACT

The purpose of the process is to remove and to recover metals from their aqueous solution by the extraction process. As extractant is used monoesters of phosphonic acid wherein the alkyl group is a phenyl-vinyl group or straight-chained and the ester group is straight-chained. The particular advantage of the process is that the metals can be removed from aqueous solutions to be treated without neutralization of the acid quantity produced during extraction, and this acid solution produced can be circulated e.g. to the stage before the extraction. The process can be used to the removing of metals from the industrial waste waters.

14 Claims, 2 Drawing Sheets

Ca o, Zn □, Mn △, Cu ▽, Mg *, Co •, Ni ×
25°C CONTINUED LINE, 50°C BROKEN LINE

EXTRACTION PROCESS FOR REMOVING AND RECOVERING METALS FROM AQUEOUS SOLUTIONS

This application is a continuation of application Ser. No. 06/746,732, filed June 20, 1985 now abandoned.

The present invention relates to a process for treating aqueous solutions in order to remove the metals contained in the said solutions, which process also includes a possibility for recovering any valuable metals present in the said solutions. More particularly, the present invention relates to a process where a through removal of the metals is required. It is not absolutely necessary to neutralize the resulting quantity of acid which is equivalent with respect to the metals, but it is possible to make use of the acid in cases where acid is needed, for instance at the leaching stage of hydrometallurgic processes.

The heavy metals contained in the residual waters from various industrial processes are generally removed by means of lime treatment. However, this method is suited only on a limited scale in the recovery of alkali earth metals, owing to the high precipitation pH of these metals. As regards heavy metals, normally 1-10 mg/l of metal remains in the lime-treated residual water, and in some cases the concentration may be even higher, depending on the metals in question and on the other ingredients of the water. Another typical feature of the lime treatment is the necessity to immediately separate the precipitated metal hydroxides from the said residual waters in order to maintain the low metal concentration achieved by precipitation. Otherwise the carbonic acid transferred into the solution from the atmosphere causes partial redissolution of the metals, which may, depending on the case in question, disturb the process.

Ion exchange by means of solid ion exchangers is another method of water treatment, which method has become popular particularly in treating various circulated waters, such as boiler and cooling waters. This method brings forth a thorough metal removal, but is generally suited only for removing slight amounts of metals from relatively waters. The humus and calcium content of the waters causes other restrictions in the application of the method owing to the increased danger of blocking of the ion exchange masses. Because of calcium concentration, it is generally necessary to revive the masses by means of using hydrochloric acid instead of sulphuric acid in order to prevent the production of gypsum.

For the time being, the method of treating waters by employing liquid ion exchangers in the ion exchange has not gained much popularity owing to the lack of essentially expedient ion exchangers. Cation exchangers of the phosphoric acid type, such as di-(2-ethyl-hexyl) phosphoric acid (HDEHP), which is one of the commonest extractants in the field of hydrometallurgy, as well as aliphatic carboxylic acids, generally require an alkali addition for neutralizing the acid released in the course of the cation exchange in order to achieve an effective removal of metals. The increased dissolubility of the above described types of cation exchangers while the pH is increased brings forth difficulties when employing these reagents in the treatment of large amounts of water, unless there is a question of simultaneously recovering some important valuable metal, or a specific purpose with respect to nature preservation.

Such metals which are extracted at a low pH value can be removed by employing HDEHP as the extractant, but a complete recovery of metals also requires neutralizing. One example is zinc which is extracted at the pH range 2-4, where the solubility of HDEHP still remains low. The method is applied for recovering zinc from weakly acidic effluents resulting from the production of rayon (Reinhardt H. et al., Solvent extraction process for recovery of zinc form weakly acidic effluent, Appl. Chem. Eng. Treat. Sewage Ind. Liq. Effluents Symp. 1975, Chem. Eng. Symposium Series No. 41). On the other hand, HDEHP-extraction is not so well suited for the recovery of nickel from nickel baths and nickel effluents due to the fact that the extraction of nickel requires that the pH value be raised to the level 5-6 (Flett D.S. et al., Recovery of metal values from effluent, Chem. Ind. 15 639 (1975)).

In the prior art, both solid and liquid ion exchangers have also been used for the recovery of zinc from pickle liquors containing HCl, $FeCl_2$ and $ZnCl_2$ (Haines A.K., The recovery of zinc from pickle liquors by ion exchange, J.S.Afr. Inst. Min. Metall. 74 149 (1973)).

Zinc is first bound as a chloridozincate complex to a highly alkalic anion resin, wherefrom it is eluated as zinc chloride by means of water. The resulting eluate is converted into zinc sulphate solution by means of HDEHP extration, with sulphuric acid as the re-extractant.

Processes based on extraction have also been suggested for the recovery of metals from mining waters, the treatment whereof is important mainly because of reasons relating to nature preservation. According to one suggestion (Andersson S.O.S. et al., MAR-Hydrometallurgical recovery process, Proceedings ISEC 77 Vol 2 798 ((1979)), metals which are more valuable than zinc are cemented from the said effluents by employing zinc powder as the cementing reagent. The cementing stage is preceded by oxidation and neutralization in order to remove iron. Similarly as in the above cases, the zinc sulphate solution is produced by means of HDEHP extraction.

In a like manner, HDEHP has been suggested and partly even used for recovering molybdenum (Nyman B. et. al., The development of the Outokumpu solvent extraction process for molybdenum, Proceedings Oslo Symposium 1982), uranium and lanthanides (Rosenbaum J.B. et al., Metallurgical application of solvent extraction 2, Practice and trends, Bureau of Mines IC 8502, (1971)) from various process solutions. In order to intensify the recovery of metals, the use of a stronger cation exchanger, such as dinonyl naphtalene sulphonic acid, has been suggested. One suggestion refers to the removal of metals from waters used in hydrogen peroxide production. HDNNS-extraction has also been suggested (Reinhardt H. et al., Swedish Patent Application No. 76 13686-0) for removing chrome and iron from a used chromiun bath; the high oxygen content of the chromium bath prevents the use of weak cation exchangers.

Being a strong acid, HDNNS is an effective cation exchanger which can be used for treating relatively acidic solutions (pH 0.5-1.5). The surface activity of these kind of sulphonic acids, however, brings forth the formation of slowly discharging emulsions, which causes difficulties in the use of these acids. After phase contacts, a rather permanent blurryness easily remains in the aqueous phases, which generally prevents the use of sulphonic acids when treating large amounts of water.

The process according to the present invention, where the metals contained in aqueous solutions are removed so that they can simultaneously be recovered, is based on the surprising observation that certain monoesters of phosphonic acid bring forth a remarkably intensive extraction of metals, which also applies for the alkali earth metals calcium and magnesium and the transition metals zinc and manganese. The said monoesters, which will be defined in detail later on, do not cause difficulties in the separation of phases after phase contact, and therefore they can be employed for metal removal or recovery even while treating large amounts of water. The circulation dispersion contactor described in the Finnish Patent Application No. 831657 is an example of an apparatus suited for this purpose. The essential novel features of the invention are apparent from the patent claim 1.

The prior art literature referring to the use of phosphonic acid monoesters a metal extractants is very scarce. In the 1960's there were issued a few publications mainly related to lanthanides and transplutonium elements (Baybarz R.D., Separation of transplutonium elements by phosphate extraction, ORNL-3273 (1962)). In the last few years, similar monoesters have attached attention as cobalt extractants while extracting cobalt fron nickel (Nyman B., Extraction process for the separation of a highly nickel-free cobalt product from aqueous solutions of cobalt and nickel, Finnish Patent Publication No. 63442).

It turned out that the structure of the hydrocarbon chains of phosphonic acid monoesters had a surprisingly strong influence in the extraction of metals while experimenting the extraction of calcium, magnesium, manganese, iron, zinc, copper, cobalt, nickel, molybdenum, uranium and lanthanides. By means of making certain changes in the structure, particularly the extraction of manganese was activated more than with any other prior art extractant. As the new extractant also brings forth a relatively intense extraction of iron, calcium and magnesium, it can be employed, apart from producing a pure manganese product, also for eliminating the hardness of water.

Owing to the intensified metal extraction, the new phosphonic acid monoesters are capable of extracting all the above mentioned metals from relatively acidic solutions. It is pointed out that nickel, the extraction whereof was weakest among the aforementioned metals, is extracted within the pH range of 3.0–3.5. Consequently the said esters are not suited for separating cobalt from nickel, due to the relatively strong extraction of the latter.

The intensified metal extraction allows for the removal of metals from used waters without neutralizing the acid formed along the cation exchange reaction, the quantity of which acid is equivalent with respect to the metals, in case it is desired to utilize the said acid. In a hydrometallurgic metal recovery process this is generally possible by means of circulating the acid solution formed in the metal extraction back into the metal leaching stage prior to the extraction.

The new phosphonic acid monoesters can also be employed for co-removal of metals from industrial waste waters, including mining waters, in cases where the metals must be removed as completely as possibly. Calcium can be removed from such process solutions which would else create gypsum-forming problems. Calcium is strongly bound to the said esters already with the pH 1–2 and can be re-extracted into loose and pure powdered gypsum by means of sulphuric acid solution.

By employing the phosphonic acid monoesters according to the present invention, the make-waters from various processes can also be cleaned of the metals contained therein. Such waters are for example the additional waters employed in different cooling systems which require a high degree of purity, particularly in systems with a closed water circulation.

The structure and properties of the phosphonic acid monoesters according to the invention can be described starting with the 2-ethyl-hexyl-2-ethyl-hexyl-phosphonate structure (HEH(EHP)):

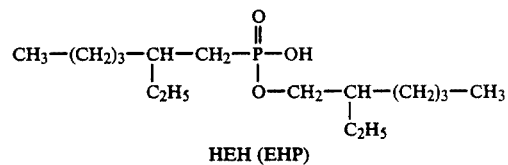

HEH (EHP)

This structure, as well as other branched alkyl structures, are not within the scope of the invention. Let it be said that 2-ethyl-hexyl, being a hydrocarbon radical, is very common, wherefore this structure is so often suggested for various extraction applications. By employing this structure, however, it is not possible to achieve a strong extractant which also would extract manganese, magnesium and calcium. As for nickel, it requires that the pH be kept between 4 and 5 in order to be extracted. Contingencies prepared for separate experiments, having the structure HEH(OP)

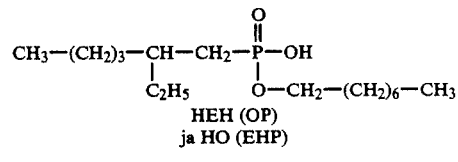

HEH (OP)
ja HO (EHP)

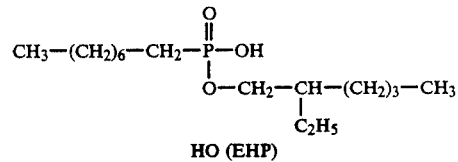

HO (EHP)

proved that a decisively stronger extractant cannot be created by replacing either the alkyl or ester group of the HEH(EHP) structure by a straight-chain structure, such as 1-octyl structure. Among the aforementioned metals, nickel requires that the pH be kept between 4 and 5 in order to be extracted.

When the ester structure was changed so that both the alkyl group and the ester group were straight-chained like the 1-octyl radical, corresponding to the structure HO(OP)

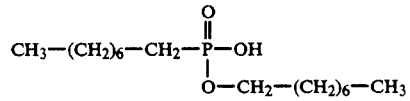

the procedure resulted in a surprisingly large amount of stronger extractants which extract metals from the more acidic solutions. It is illustrative of this that after the said change in the structure, manganese and magnesium for example can be extracted from a solution which has a pH value 1-1.5 units more acidic than before, and nickel extraction can be successfully carried out already within the pH range of 3-4.

The strongest feasible phosphonic acid monoester compound was achieved by replacing the alkyl group with a phenyl-vinyl group and the ester group by a 1-octyl group, the resulting structure corresponding to HO(PhV).

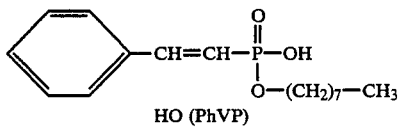
HO (PhVP)

By employing this structure, calcium, manganese and zinc can be extracted within the pH 1.0-1.5, and even nickel is extracted at the pH of approximately 3.

It is not to be expected that the extractive properties of the said phosphonic acid monoesters would be essentially changed if the straight hydrocarbon chains should vary between $C_4$ and $C_{10}$. The increase in solubility into water, and the resulting increase in branching into water, prevents the use of hydrocarbon chains shorter than $C_4$, whereas chains longer that $C_{10}$ tend to be disadvantageous because the extractive capacity decreases while the molecular weight of the esters increases.

The phosphonic acid monoesters are employed diluted in hydrocarbon, for example a kerosine-type or chlorinated hydrocarbon. It is considered a general rule that the flashpoint of the hydrocarbon in question must be 20° C. higher than the respective operation temperature. In addition to this, a longer alcohol, such as $C_8$-$C_{12}$ alcohol, or organic phosphates such as tributyl phosphate (TBP), can be added to the said extractant solution. This addition mainly improves the separation of phases, which is important if the treated waters contain foreign ingredients which lower the phase interfacial tension.

Raising the temperature has proved to be another means for improving the extraction of most of the metals discussed herein. An increase from the example 25° C. up to 60° C. has a remarkable influence in the process, as is apparent from the following examples.

BRIEF DESCRIPTION OF THE DRAWINGS

The dependence of the distribution D of some metals on the pH values has been described in FIGS. 1 and 2. The metals are Zn, Mn, Cu, Co, Ni, Ca and Mg. The distribution D indicates the concentration ratio of each metal in between the solution phases in equilibrium, $D=\bar{C}/C$, $\bar{C}$ being the concentration in the extractant solution and C being the concentration in the aqueous solution. The metals described are removed from a sodium sulphate solution containing $Na_2SO_4$ 71 g/1.

EXAMPLE 1

Figure 1:
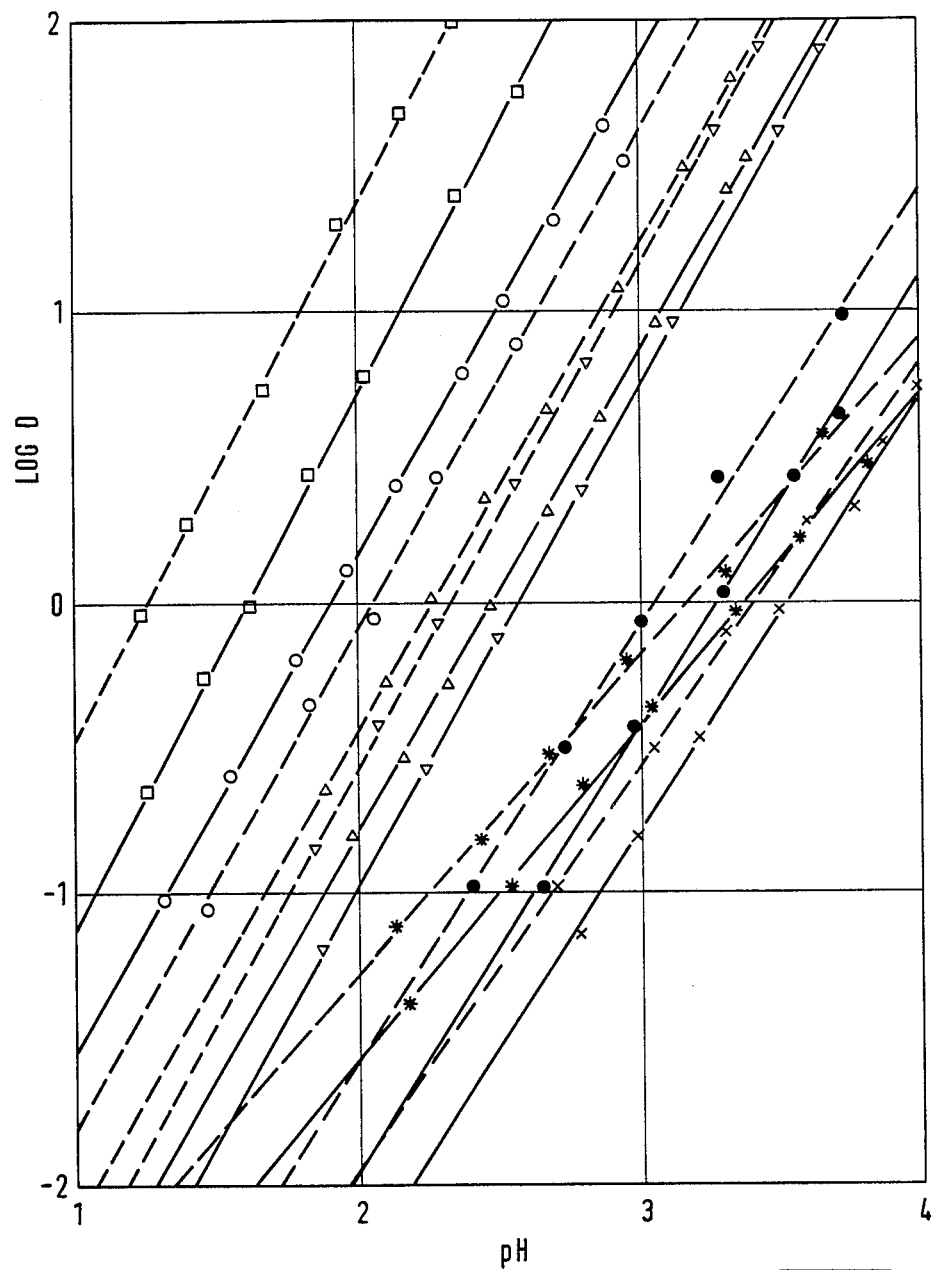
In FIG. 1, the extractant solution consisted of 20% by vol. HO(OP)/5% by vol. TBP/ 75% by vol. Shellsol K, and was employed either in the temperature 25° C. (with continuous line) or in the temperature 50° C. (with broken line).

Metal recovery was carried out from cobalt and magnesium -bearing or cobalt and nickel -bearing aqueous solutions by employing an extractant solution consisting of 20% by vol. (HO(OP)/5% by vol. TBP/75% by vol. Shellsol K or 20% by vol. HO(PhVP)/5% by vol. TBP/75% by vol. Shellsol K (Shellsol K is a kerosine product composed of aliphatic hydrocarbons). The reference experiments were also carried out by employing an extractant solution consisting of 20% by vol. HEH(EHP)5% by vol. TBP/75% by vol. Shellsol K. The volume of all aqueous solutions, as well as the volume of all extractant solutions in contact with them, was 50 ml. During a 15 minute mixing stage, the temperature was 25° C. and the pH value followed the readings given in the tables I.A and I.B below. With each pH value, a separate extraction experiment was carried out by employing the same original solution throughout each table and a solution containing 120 g/1 NaOH as the pH-regulating reagent.

TABLE IA

Aqueous slution pior to extraction:
Co 1000 mg/1,
Mg 1000 mg/1

| | Phosphonic acid monoester | | | | | |
|---|---|---|---|---|---|---|
| | HEH (EHP) | | HO (OP) | | HO (PhVP) | |
| pH | Co | Mg | Co | Mg | Co | Mg |
| | | | mg/1 | | | |
| 3,0 | 811 | 992 | 689 | 696 | 263 | 270 |
| 3,5 | 430 | 597 | 256 | 370 | 54 | 107 |
| 4,0 | 122 | 414 | 64 | 158 | 12 | 35 |
| 4,5 | 27 | 35 | 12 | 43 | 2,0 | 11 |

TABLE IB

Aqueous solution prior to extraction:
Co 1000 mg/1,
Ni 1000 mg/1

| | Phosphonic acid monoester | | | | | |
|---|---|---|---|---|---|---|
| | HEH (EHP) | | HO (OP) | | HO (PhVP) | |
| pH | Co | Ni | Co | Ni | Co | Ni |
| | | | mg/1 | | | |
| 3,0 | 795 | 933 | 658 | 857 | 256 | 470 |
| 3,5 | 407 | 881 | 230 | 485 | 46 | 127 |
| 4,0 | 104 | 602 | 56 | 157 | 8 | 29 |
| 4,5 | 23 | 193 | 11 | 35 | 1,5 | 5 |

EXAMPLE 2

The same arrangements were used as in Example 1, with the difference that the aqueous solutions contained either 1000 mg/1 Co or 1000 mg/1 Ni. Apart from the previous extractant solutions, also the solutions consisting of 20% by vol. HEH(OP)/5% by vol. TBP/75% by vol. Shellsol K were tested. The table below II gives the $pH_{50}$ values which indicate the respective pH readings where 50% of the metal in question has been extracted.

TABLE II

The table $pH_{50}$ values

| | Phosphonic acid monoester | | | | |
|---|---|---|---|---|---|
| Metal | HEH (EHP) | HEH (OP) | HO (EHP) | HO (OP | HO (PhVP) |
| Co | 3,6 | 3,7 | 3,7 | 3,3 | 2,6 |
| Ni | 4,0 | 4,1 | 4,1 | 3,5 | 2,9 |

EXAMPLE 3

In order to reduce the hardness of water, in the temperature 25° C. there was mixed 50 ml of water containing Ca 26 mg/l, Mg 11 mg/l, Mn 1,7 mg/l and Fe 0,8 mg/l to 50 ml of the extractant solution, consisting of 20% by vol. HO(PhVP)/5% by vol TBP/75% by vol Shellsol K. At the end of the 15 minute mixing period, the water contained only Ca 0,7 mg/l, Mg 5,0 mg/l, Mn 0,06 mg/l and Fe<0,05 mg/l while the water pH was 2,5.

EXAMPLE 4

Calcium was removed from a nearly gypsum-saturated aqueous solution by mixing 50 ml of the said solution in the temperature 50° C. to 50 ml of the extractant solution consisting of 20% by vol. HO(PhVp)/5% by vol. TBP/75% by vol. Shellsol K. Before the 15-minute mixing period, the calcium content was 880 mg/l, and after the period 7,0 mg/l, while the pH of the aqueous solution was 2,1.

EXAMPLE 5

Zinc and manganese were removed from a sodium sulphate solution containing $Na_2SO_4$ 71 g/l, Zn 250 mg/l and Mn 250 mg/l. The metal removal was carried out by employing as the extractant solution both 30% by vol. HO(OP)/5% by vol. TBP/75% by vol. Shellsol K, and 20% by vol. HO(O)/5% by vol. HO(PhVP)/5% by vol. TBP/75% by vol. Shellsol K. The volume of the extractant solutions was 50 ml, and the volume of the sodium sulphate solution was the same. The mixing contact was created in the temperature 25° C. by applying a 15-minute mixing period, and a sulphuric acid solution containing 300 g/l $H_2SO_4$ or a sodium hydroxide solution containing 120 g/l NaOH for regulating the pH. The zinc and manganese concentrations of the sodium sulphate solution after the treatment are listed in the table III below.

TABLE III

| | Phosphonic acid monoester | | | |
| | HO (OP) | | HO (PhVP) | |
| pH | Zn | Mn | Zn | Mn |
| | | mg/l | | |
|---|---|---|---|---|
| 2,00 | 45 | 216 | 8,1 | 32 |
| 2,25 | 18 | 178 | 3,0 | 12 |
| 2,50 | 6,4 | 128 | 1,0 | 4,3 |
| 2,75 | 2,1 | 69 | <0,5 | 1,6 |
| 3,00 | 0,7 | 34 | <0,5 | 0,6 |

EXAMPLE 6

A similar metal removal as for instance in Example 5 was carried out with the difference that the mixing temperature was 50° C. The influence of the temperature is apparent from the table IV below.

TABLE IV

| | Phosphonic acid monoester | | | |
| | HO (OP) | | HO (PhVP) | |
| pH | Zn | Mn | Zn | Mn |
| | | mg/l | | |
|---|---|---|---|---|
| 2,00 | 11 | 187 | 2,1 | 15 |
| 2,25 | 4,0 | 124 | <0,9 | 5,7 |
| 2,50 | 1,4 | 71 | <0,5 | 2,0 |
| 2,75 | <0,5 | 35 | <0,5 | 0,8 |
| 3,00 | <0,5 | 16 | <0,5 | <0,5 |

EXAMPLE 7

Iron (III), uranium (VI) and molybdenum (VI) were removed from a sodium sulphate solution by employing an extractant solution consisting of 20% by vol. HO(PhVP)/5% by vol. TBP/75% by vol. Shellsol K in the temperature 50° C. The volume of each solution to be mixed was 50 ml and the length of the mixing period was 15 min. This treatment reduced the initial concentration of the aqueous solution containing 71 g/l sodium sulphate, i.e. Fe 15 mg/l, U 11 mg/l and Mo 23 mg/l, to below 1 mg/l with respect to Fe and U, and to 3,0 mg/l with respect to Mo.

EXAMPLE 8

The distribution D of the metals Zn, Mn, Cu, Co, Ni, Ca and Mg, which distribution D in the case of each individual metal indicates the concentration ratio of the said metal in between the solution phases in equilibrium ($D = \bar{C}/C$, $\bar{C}$ being the concentration in the extractant solution, and C being concentration in the aqueous solution), was determined by employing the same procedure for removing metals as in Examples 5 and 6. The extractant solution consisted of 20% by vol. HO-(OP)/5% by vol. TBP/75% by vol. Shellsol K, and was employed either in the temperature 25° C. or 50° C. in order to remove metals from an aqueous solution containing 71 g/l $Na_2SO_4$. The dependence of the said metal distributions on the pH value is apparent from FIG. 1, which an expert in the field can use for evaluating the possibilities for the removal, separation and recovery of various metals.

EXAMPLE 9

Figure 2:
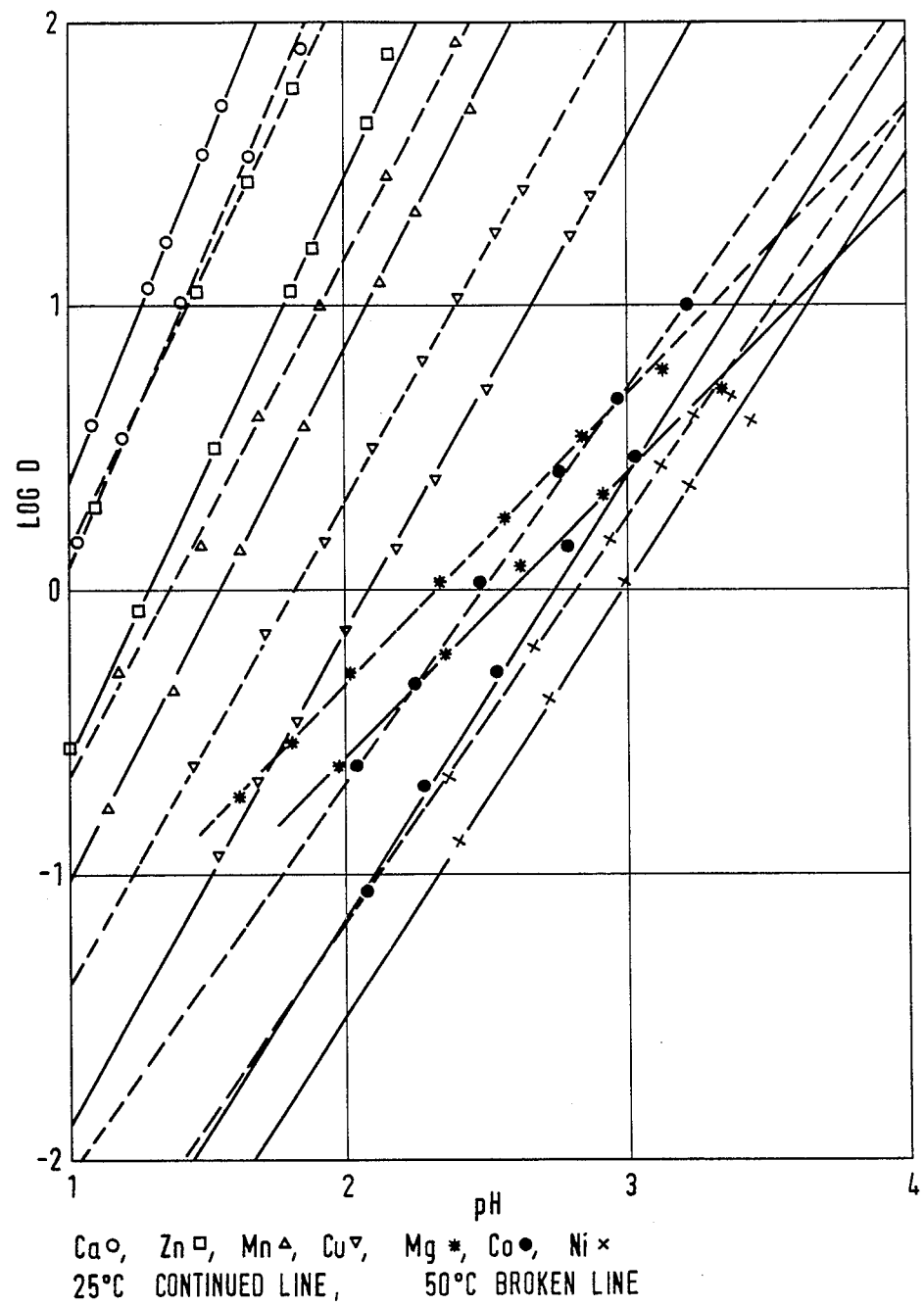
In FIG. 2, the extractant solution consisted of 20% vol. HO(phVP)/5% by vol. TBP/75% by vol. Shellsol K, the other conditions are the same as in FIG. 1.

Respective metal removal determinations as in Example 8 were carried out by employing an extractant solution consisting of 20% by vol. HO(PhVP) 5% by vol TBP/75% by vol. Shellsol K. FIG. 2 illustrates the pH-dependency in the distribution of various metals.

We claim:

1. A process for removing and recovering metal from the aqueous sulfate solution thereof comprising
   contacting said aqueous sulfate solution with an extractant solution comprising a metal extractant diluted in a liquid hydrocarbon comprising a kerosine-type hydrocarbon or a chlorinated hydrocarbon,
   wherein said metal extractant is a substituted phosphonic acid monoester, in which the substituted moiety is a phenyl-vinyl group, and in which a 1-octyl group is employed as the ester group of the phosphonic acid monoester;
   whereby the concentration of the metal in the aqueous sulfate solution decreases, and whereby the concentration of the metal in the extractant solution increases,
   separating the extractant solution having increased metal concentration from the aqueous sulfate solution having decreased metal concentration, and
   recovering said metal from the extractant solution, so that the metals can be removed from the aqueous solutions to be treated without neutralizing the quantity of acid which is generated during the extraction.
2. The process of claim 1, wherein the extraction temperature ranges between 20°-60° C.

3. The process of claim 1 wherein the metal is selected from the group consisting of Co, Mg, Ni, Cu, Mn, Fe, Ca, Zn, U, Mo, and mixtures thereof.

4. The process of claim 1 wherein the metal is selected from the group consisting of Zn, Mn, Cu, Co, Ni, Ca, Mg, and mixtures thereof.

5. The process of claim 1 wherein an organic phosphate is added to the extractant solution.

6. The process of claim 5 wherein the organic phosphate is tributyl phosphate.

7. The process of claim 1 wherein a $C_8$–$C_{12}$ alcohol is added to the extractant solution.

8. The process of claim 1 wherein the metal is Ca.

9. The process of claim 1 wherein the metal is Zn.

10. The process of claim 1 wherein the metal is Mn.

11. The process of claim 1 wherein the metal is Cu.

12. The process of claim 1 wherein the metal is Mg.

13. The process of claim 1 wherein the metal is Co.

14. The process of claim 1 wherein the metal is Ni.

* * * * *

UNITED STATES PATENT AND TRADEMARK OFFICE
CERTIFICATE OF CORRECTION

PATENT NO. : 4,818,503
DATED : April 4, 1989
INVENTOR(S) : Bror G. Nyman et al

It is certified that error appears in the above-identified patent and that said Letters Patent is hereby corrected as shown below:

Column 1 line 44, "relatively waters" should read:
    --relatively low polluted waters--.

Column 3:

line 21, "a metal extractants" should read:
    --as metal extractants--.

Column 5:

line 11, "HO(PhV)" should read: --HO(PhVP)--.

line 67, "vol. HO(phVP)" should read: --HO(PhVP)--.

Signed and Sealed this

Seventh Day of November, 1989

*Attest:*

JEFFREY M. SAMUELS

*Attesting Officer*      *Acting Commissioner of Patents and Trademarks*